United States Patent [19]

Ito

[11] Patent Number: 5,535,289
[45] Date of Patent: Jul. 9, 1996

[54] METHOD FOR REDUCING NOISE IN ENERGY SUBTRACTION IMAGES

[75] Inventor: Wataru Ito, Kanagawa-ken, Japan

[73] Assignee: Fuji Photo Film Co., Ltd., Kanagawa, Japan

[21] Appl. No.: 305,391

[22] Filed: Sep. 13, 1994

[30] Foreign Application Priority Data

Sep. 13, 1993 [JP] Japan ................................. 5-226843

[51] Int. Cl.$^6$ ................................................. G06K 9/40
[52] U.S. Cl. ..................... 382/130; 382/275; 364/413.23
[58] Field of Search ................................... 382/130, 132, 382/254, 264, 275, 284; 378/62, 98.11, 98.12; 250/584, 587; 364/413.13, 413.23; 128/653.1

[56] References Cited

U.S. PATENT DOCUMENTS

| | | | |
|---|---|---|---|
| 4,551,800 | 11/1985 | Riederer et al. | 364/414 |
| 4,710,875 | 12/1987 | Nakajima et al. | 364/414 |
| 4,816,681 | 3/1989 | Shimura | 250/327.2 |
| 4,868,857 | 9/1989 | Dobbins, III | 378/99 |
| 5,020,085 | 5/1991 | Kawara et al. | 378/99 |
| 5,029,083 | 7/1991 | Shimura et al. | 364/413.23 |
| 5,161,178 | 11/1992 | Honda et al. | 378/99 |
| 5,285,786 | 2/1994 | Fujii | 128/653.1 |
| 5,291,403 | 3/1994 | Ito | 364/413.23 |

FOREIGN PATENT DOCUMENTS

| | | |
|---|---|---|
| 0455986 | 11/1991 | European Pat. Off. |
| 4-156689 | 5/1992 | Japan |

*Primary Examiner*—Leo Boudreau
*Assistant Examiner*—Andrew W. Johns
*Attorney, Agent, or Firm*—Sughrue, Mion, Zinn, Macpeak & Seas

[57] ABSTRACT

Radiation images of an object, which have been recorded on recording media and in which different images of at least part of the object are embedded, are read out from the recording media, and a plurality of original image signals, each of which is made up of a series of image signal components, are thereby obtained. The image signal components of the original image signals, which represent corresponding picture elements in the radiation images, are then subtracted from each other, and a difference signal representing an image of a specific structure of the object is thereby obtained. A smoothing process is carried out on an original image signal, and a smoothed image signal is thereby obtained. The image signal components of the original image signal and the difference signal, which represent corresponding picture elements in the images, are weighted such that the weight given to the original image signal may be made larger as the image density represented by the smoothed image signal with respect to a picture element becomes lower. The weighted image signal components are then averaged. A composite image signal obtained from the weighted averaging process is utilized for reproduction of a visible radiation image of the object.

11 Claims, 6 Drawing Sheets

METHOD FOR REDUCING NOISE IN ENERGY SUBTRACTION IMAGES

BACKGROUND OF THE INVENTION

1. Field of the Invention

This invention relates to a method for processing an energy subtraction image such that noise occurring in the energy subtraction image, which is obtained from energy subtraction processing of radiation images, can be reduced.

2. Description of the Prior Art

Techniques for carrying out subtraction processing on radiation images have heretofore been known. When subtraction processing is to be carried out, a plurality of (basically, two) radiation images recorded under different conditions are photoelectrically read out, and digital image signals which represent the radiation images are thereby obtained. The image signal components of the digital image signals, which represent corresponding picture elements in the radiation images, are then subtracted from each other, and a difference signal is thereby obtained which represents the image of a specific structure or part of the object represented by the radiation images. With the subtraction processing method, the plurality of digital image signals are subtracted from each other in order to obtain a difference signal, and the radiation image of a specific structure can be reproduced from the difference signal.

Basically, subtraction processing is carried out with either the so-called temporal (time difference) subtraction processing method or the so-called energy subtraction processing method. In the former method, in order to extract the image of a specific structure of an object from the image of the entire object, the image signal representing a radiation image obtained without injection of contrast media is subtracted from the image signal representing a radiation image in which the image of the specific structure of the object is enhanced by the injection of contrast media. In the latter method, an object is exposed to several kinds of radiation having different energy distributions. Alternatively, the energy distribution of the radiation carrying image information of an object, is changed after it has been irradiated onto one of a plurality of radiation image recording media, after which the radiation impinges upon the second radiation image recording medium. In this manner, a plurality of radiation images, in which different images of a specific structure of the object are embedded, are obtained. Thereafter, the image signals representing the plurality of radiation images are weighted appropriately, when necessary, and subjected to a subtraction process, and the image of the specific structure of the object is thereby extracted.

Also, it has been proposed to use stimulable phosphors in radiation image recording and reproducing systems. Specifically, a sheet provided with a layer of the stimulable phosphor (hereinafter referred to as a stimulable phosphor sheet) is first exposed to radiation, which carries image information of an object, such as a human body. In this manner, a radiation image of the object is stored on the stimulable phosphor sheet. The stimulable phosphor sheet, on which the radiation image has been stored, is then exposed to stimulating rays, which cause it to emit light in proportion to the amount of energy stored thereon during its exposure to the radiation. The light emitted by the stimulable phosphor sheet, when it is exposed to the stimulating rays, is photoelectrically detected and converted into an electric image signal. The electric image signal is then processed, and the processed image signal is then used during the reproduction of a visible image, which has good image quality and can serve as an effective tool in, particularly, the efficient and accurate diagnosis of an illness.

In the radiation image recording and reproducing systems wherein the stimulable phosphor sheets are utilized, the radiation images stored on the stimulable phosphor sheets are directly read out in the form of the electric image signals. Therefore, with the radiation image recording and reproducing systems, the subtraction processing described above can be carried out easily. Also, in cases where radiation images are recorded on sheets of X-ray photographic film, the radiation images can be read out from the X-ray photographic film by using a microphotometer, or the like, and image signals representing the radiation images can thereby be obtained. Therefore, in such cases, it is possible to carry out the subtraction processing described above.

However, problems have heretofore been encountered in that an energy subtraction image, which is obtained from the energy subtraction processing, contains much noise at a low image density portion, to which only a small amount of radiation could reach during the image recording operation. In cases where a graininess improving process is carried out on the entire area of the energy subtraction image as in conventional techniques, high-frequency noise reduces in the low image density portion, but low-frequency noise remains in the low image density portion. As a result, an artifact giving a grainy feeling occurs in the image.

By way of example, in cases where the radiation image is the image of the chest of a human body, the low image density portion described above corresponds to a vertebral body, or the like. Therefore, adverse effects of the artifact on the actual diagnoses will be comparatively small. However, an energy subtraction image having such an artifact is very hard to see and gives an unfavorable impression to persons who see it.

SUMMARY OF THE INVENTION

The primary object of the present invention is to provide a method for processing an energy subtraction image, wherein noise occurring at a low image density portion in the energy subtraction image is reduced.

Another object of the present invention is to provide a method for processing an energy subtraction image, wherein an artifact due to low-frequency noise is prevented from occurring in a low image density portion in the energy subtraction image.

The present invention provides a method for processing an energy subtraction image in energy subtraction processing, wherein a plurality of radiation images of an object, which have been recorded on a plurality of recording media and in which different images of at least part of the object are embedded, are read out from the recording media, a plurality of sets of original image signals, each of which is made up of a series of image signal components, being thereby obtained, and the image signal components of the plurality of sets of the original image signals, which image signal components represent corresponding picture elements in the plurality of the radiation images, are then subtracted from each other, a difference signal representing an image of a specific structure of the object being thereby obtained, the method comprising the steps of:

i) carrying out a smoothing process on an original image signal, a smoothed image signal being thereby obtained, ii) weighting the image signal components of the original image signal and the difference signal, which image signal components represent corresponding picture elements in the images, such that the weight given to the original image signal may be made larger as the image density represented by the smoothed image signal with respect to a picture element becomes lower, the weighted image signal components being thereafter averaged, and iii) utilizing a composite image signal, which has thus been obtained from the weighted averaging process, for reproduction of a visible radiation image of the object.

In the method for processing an energy subtraction image in accordance with the present invention, during the weighted averaging process, the weight given to the original image signal is made larger as the image density represented by the smoothed image signal with respect to a picture element becomes lower. Specifically, the weight may be increased monotonously as the image density becomes lower within the entire range of the image density. Alternatively, at part of the entire range of the image density, the weight may not be changed even if the image density becomes lower.

With the method for processing an energy subtraction image in accordance with the present invention, the composite image signal is obtained from the weighted averaging process carried out on the original image signal and the difference signal. The image represented by the composite image signal is equivalent to an image obtained by combining part of the original image with the energy subtraction image or by combining an image, which is close to the original image, with the energy subtraction image. As the weight given to the original image signal becomes larger (i.e. as the weight given to the difference signal becomes smaller), the composite image signal becomes closer to the original image signal. Noise at a low image density portion in the energy subtraction image occurs due to the energy subtraction processing and is not present in the original image. Therefore, with the method for processing an energy subtraction image in accordance with the present invention, the composite image signal corresponding to the low image density portion is rendered close to the original image signal. In this manner, noise described above can be reduced in the visible image reproduced from the composite image signal.

Also, with the method for processing an energy subtraction image in accordance with the present invention, the weight given to the original image signal is made larger as the image density represented by the smoothed image signal with respect to a picture element becomes lower. Therefore, at adjacent picture elements which are located at an image portion having a density gradient, the composite image signal does not change sharply from a value close to the original image signal to a value close to the difference signal. Accordingly, the problems can be prevented from occurring in that a large difference in image density occurs between adjacent picture elements in the reproduced image due to such a sharp change in the composite image signal.

Further, in an original image, it will often occur that the image density changes sharply at an edge of a structure of the object, or the like. However, with the method for processing an energy subtraction image in accordance with the present invention, instead of the weight being changed in accordance with the signal representing such an original image, the weight used in the weighted averaging process is changed in accordance with the image density represented by the signal, which is obtained by carrying out the smoothing process on the original image signal. Therefore, at the edge of a structure of the object, or the like, the composite image signal does not change sharply from a value close to the original image signal to a value close to the difference signal. Accordingly, the problems can be prevented from occurring in that a large difference in image density occurs between adjacent picture elements in the reproduced image due to such a sharp change in the composite image signal.

As described above, with the method for processing an energy subtraction image in accordance with the present invention, the energy subtraction image is processed such that a portion of the energy subtraction image, at which noise is apt to occur, is replaced by an original image, which does not contain such noise, or by an image close to the original image. Therefore, the method for processing an energy subtraction image in accordance with the present invention can reliably eliminate the problems in that low-frequency noise due to the energy subtraction processing remains unremoved and an artifact due to such low-frequency noise occurs in the energy subtraction image.

DESCRIPTION OF THE PREFERRED EMBODIMENTS

The present invention will hereinbelow be described in further detail with reference to the accompanying drawings.

In embodiments described below, stimulable phosphor sheets are utilized as the recording media.

Figure 2:
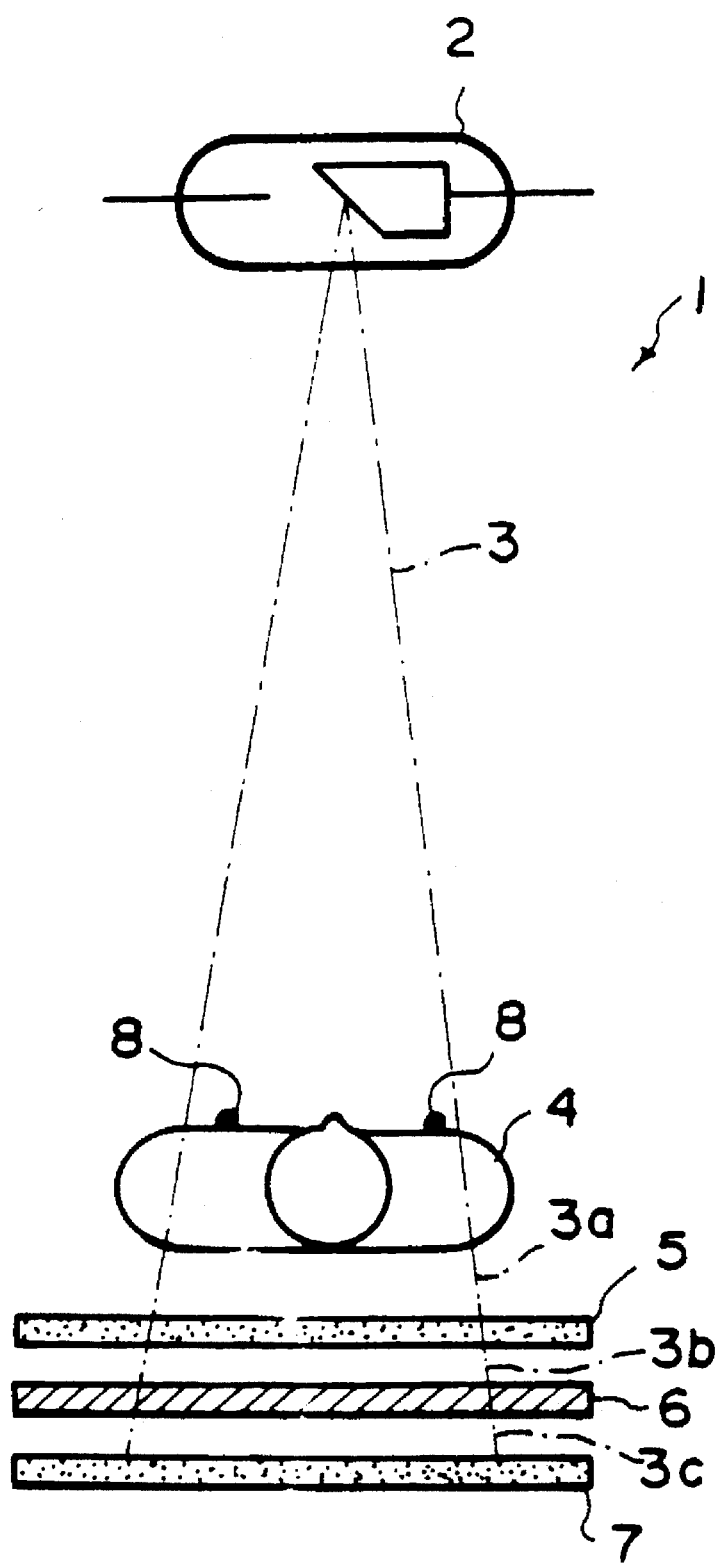
FIG. 2 is a schematic view showing an example of an X-ray image recording apparatus.

A first embodiment of the method for processing an energy subtraction image in accordance with the present invention will be described hereinbelow. FIG. 2 is a schematic view showing an X-ray image recording apparatus 1.

With reference to FIG. 2, X-rays 3 are produced by an X-ray tube 2 of the X-ray image recording apparatus 1 and irradiated to an object 4 (in this example, the chest of a human body). X-rays 3a, which have passed through the object 4, impinge upon a first stimulable phosphor sheet 5, and energy from the comparatively low energy components of the X-rays 3a is stored on the first stimulable phosphor sheet 5. In this manner, an X-ray image of the object 4 is stored on the first stimulable phosphor sheet 5. X-rays 3b, which have passed through the first stimulable phosphor sheet 5, then pass through a filter 6 for filtering out the low energy components of the X-rays. X-rays 3c, which have passed through the filter 6 and are composed of the high energy components, impinge upon a second stimulable phosphor sheet 7. In this manner, an X-ray image of the object 4 is stored on the second stimulable phosphor sheet 7. During the image recording operation, marks 8, 8 are placed on the object 4. The images of the marks 8, 8 are utilized in the course of adjusting the positions of the two X-ray images so that the two X-ray images may coincide with each other.

In the X-ray image recording apparatus 1, the X-ray images are stored on the first stimulable phosphor sheet 5 and the second stimulable phosphor sheet 7 with a single, simultaneous recording operation. Alternatively, the two X-ray images may be recorded one after the other with two independent recording operations.

Figure 3:
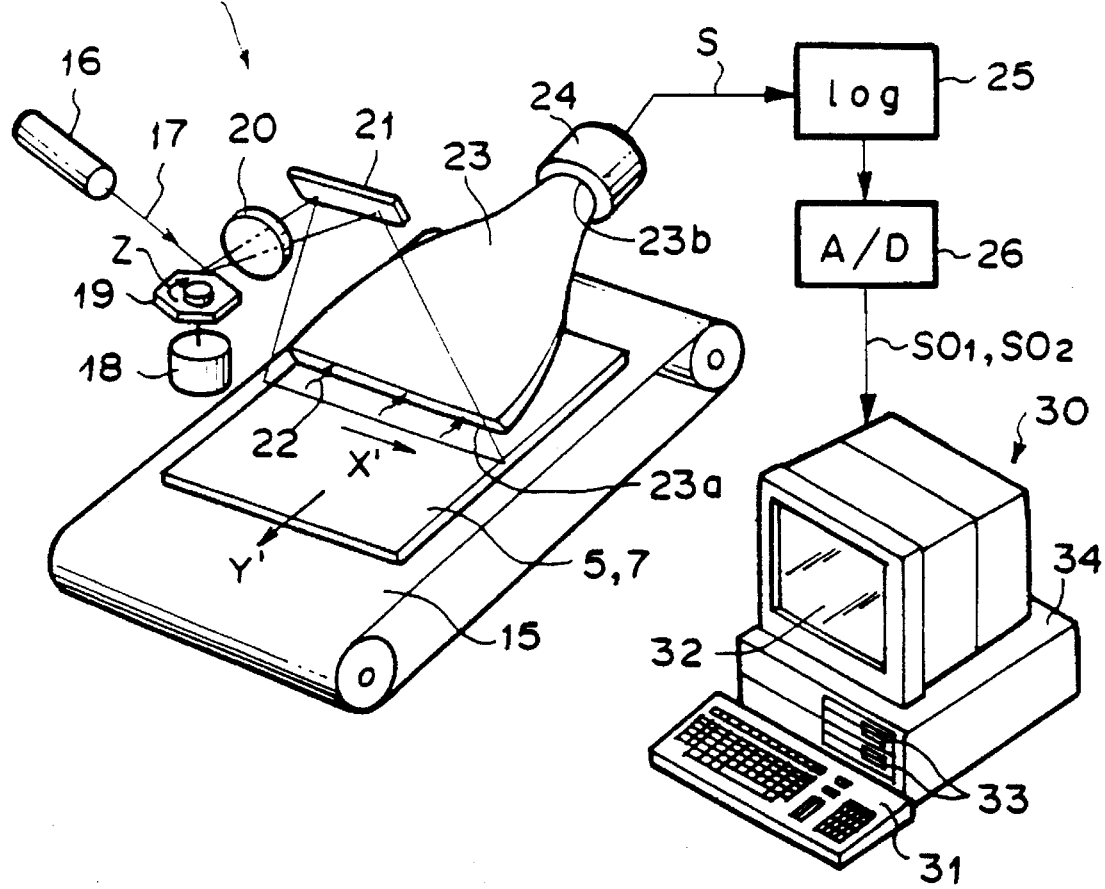
FIG. 3 is a perspective view showing an example of an apparatus for carrying out the method for processing an energy subtraction image in accordance with the present invention.

FIG. 3 is a perspective view showing an X-ray image read-out apparatus 10 and an image processing and displaying apparatus 30 for carrying out the method for processing an energy subtraction image in accordance with the present invention.

After the first X-ray image and the second X-ray image have been stored respectively on the first stimulable phosphor sheet 5 and the second stimulable phosphor sheet 7 in the X-ray image recording apparatus 1 shown in FIG. 2, the first stimulable phosphor sheet 5 and the second stimulable phosphor sheet 7 are placed one after the other at a predetermined position in the X-ray image read-out apparatus 10 shown in FIG. 3. How the first X-ray image (i.e. the X-ray image recorded with the X-rays having a low energy level) is read out from the first stimulable phosphor sheet 5 will be described hereinbelow.

With reference to FIG. 3, the first stimulable phosphor sheet 5 is conveyed in a sub-scanning direction, which is indicated by the arrow Y, by a sheet conveyance means 15. The sheet conveyance means 15 may be constituted of an endless belt, or the like, and is operated by an operating means (not shown). A laser beam 17, which serves as stimulating rays, is produced by a laser beam source 16. The laser beam 17 is reflected and deflected by a rotating polygon mirror 19, which is being quickly rotated by a motor 18 in the direction indicated by the arrow Z. The laser beam 17 then passes through a converging lens 20, which is constituted of an fθ lens, or the like. The direction of the optical path of the laser beam 17 is then changed by a mirror 21, and the laser beam 17 is caused to impinge upon the first stimulable phosphor sheet 5 and scan it in a main scanning direction indicated by the arrow X. The main scanning direction is approximately normal to the sub-scanning direction indicated by the arrow Y.

When the first stimulable phosphor sheet 5 is exposed to the laser beam 17, the exposed portion of the first stimulable phosphor sheet 5 emits light 22 in an amount proportional to the amount of energy stored thereon during its exposure to the X-rays. The emitted light 22 is guided by a light guide member 23, and photoelectrically detected by a photomultiplier 24. The light guide member 23 is made from a light guiding material, such as an acrylic plate. The light guide member 23 has a linear light input face 23a, positioned to extend along the main scanning line on the first stimulable phosphor sheet 5, and a ring-shaped light output face 23b, positioned so that it is in close contact with a light receiving face of the photomultiplier 24. The emitted light 22, which has entered the light guide member 23 from its light input face 23a, is guided through repeated total reflection inside of the light guide member 23, emanates from the light output face 23b, and is received by the photomultiplier 24. In this manner, the amount of the emitted light 22, which amount represents the first X-ray image stored on the first stimulable phosphor sheet 5, is converted into an electric signal by the photomultiplier 24.

An analog photo detection signal S, which has been generated by the photomultiplier 24, is logarithmically amplified by a logarithmic amplifier 25, and converted by an A/D converter 26 into a digital image signal SO. The image signal SO thus obtained represents the first X-ray image, which was stored on the first stimulable phosphor sheet 5, and will hereafter be referred to as the first image signal SO1. The first image signal SO1 is stored in an internal memory of the image processing and displaying apparatus 30.

The image processing and displaying apparatus 30 is provided with a keyboard 31, from which various instructions are entered, and a CRT display device 32, which displays auxiliary information for instructions and a visible image represented by an image signal. The image processing and displaying apparatus 30 is also provided with a floppy disk drive unit 33, which receives and operates a floppy disk serving as an auxiliary storage medium, and a main body 34 which incorporates a CPU and the internal memory.

Thereafter, in the same manner as that described above, a second image signal SO2 is obtained which represents the second X-ray image stored on the second stimulable phosphor sheet 7 (i.e. the X-ray image recorded with the X-rays having a high energy level). The second image signal SO2 is stored in the internal memory of the image processing and displaying apparatus 30.

Figure 1A:
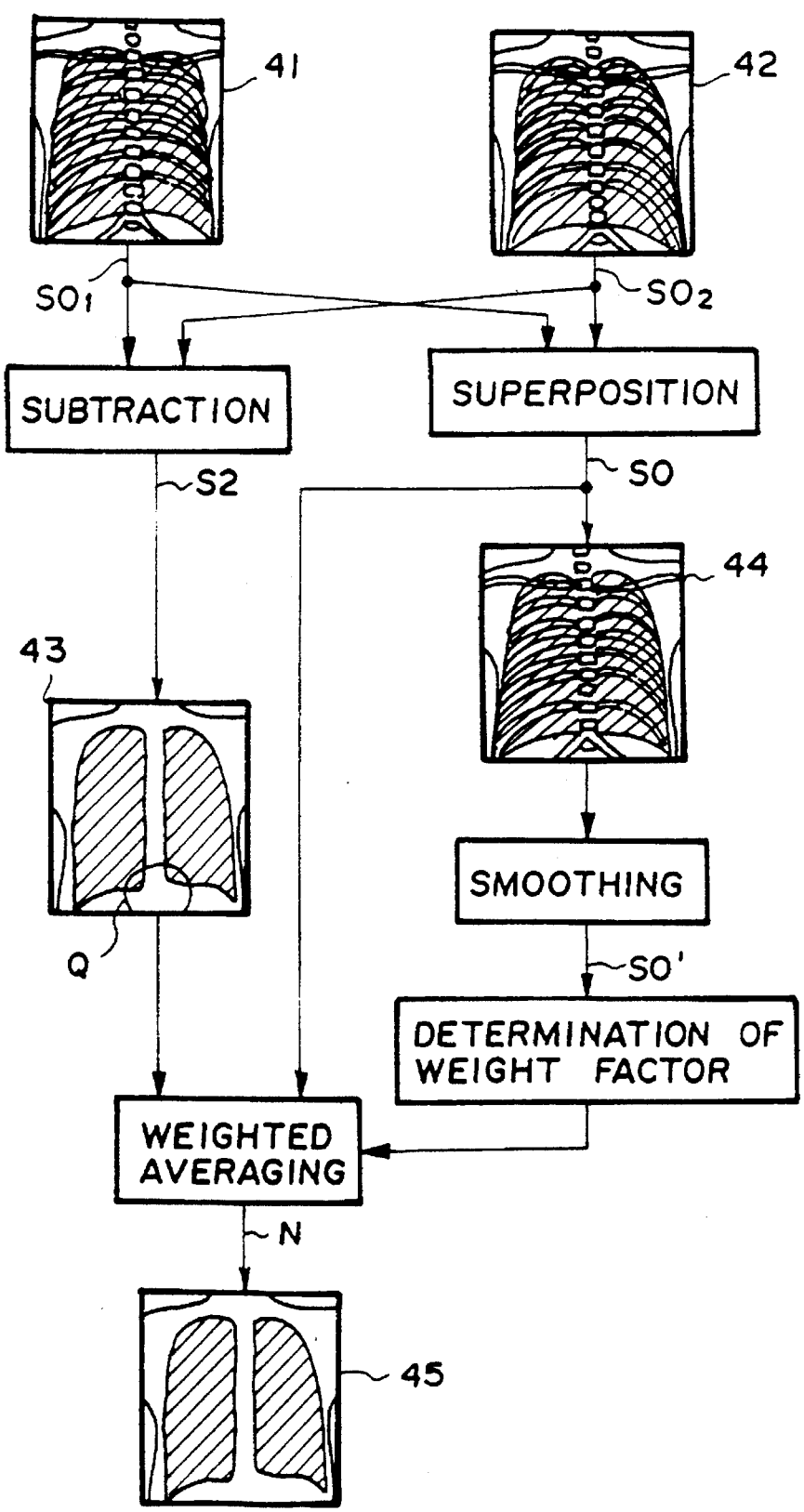
FIG. 1A is a flow chart showing the processes in a first embodiment of the method for processing an energy subtraction image in accordance with the present invention.

FIG. 1A is a flow chart showing the processes, which are carried out in the image processing and displaying apparatus 30. The processes are carried out on the first image signal SO1 representing the first X-ray image and the second image signal SO2 representing the second X-ray image, which signals are stored in the internal memory of the image processing and displaying apparatus 30.

The first image signal SO1 and the second image signal SO2, which are stored in the internal memory of the image processing and displaying apparatus 30, represent a first X-ray image 41 and a second X-ray image 42 shown in FIG. 1A. The first X-ray image 41 has been recorded with the comparatively low energy components of the X-rays. The second X-ray image 42 has been recorded with the comparatively high energy components of the X-rays. Both of the first X-ray image 41 and the second X-ray image 42 are original images, which are composed of patterns of soft tissues and bones. The levels of image density of the soft tissue patterns and the bone patterns are different between the first X-ray image 41 and the second X-ray image 42.

The first image signal SO1 and the second image signal SO2 are read from the internal memory of the image processing and displaying apparatus 30 shown in FIG. 3. Position adjustment processing is then carried out on the first image signal SO1 and the second image signal SO2 such that the positions of the first X-ray image 41 represented by the first image signal SO1 and the second X-ray image 42 represented by the second image signal SO2 may coincide with each other. For this purpose, a method disclosed in, for example, U.S. Pat. No. 4,710,875 may be employed. With the position adjustment processing, one of the two X-ray images is linearly moved or rotated with respect to the other X-ray image until the images of the marks 8, 8 in one X-ray image, which marks are shown in FIG. 2, overlap the images of the marks 8, 8 in the other X-ray image.

Thereafter, a subtraction process is carried out on the first image signal SO1 and the second image signal SO2.

Specifically, X-ray absorption coefficients μ are classified into the following:

μLT: Absorption coefficient of soft tissues with respect to the low energy components of X-rays.

μHT: Absorption coefficient of soft tissues with respect to the high energy components of X-rays.

μLB: Absorption coefficient of bones with respect to the low energy components of X-rays.

μHB: Absorption coefficient of bones with respect to the high energy components of X-rays.

The first image signal SO1 and the second image signal SO2 are weighted, and the image signal components of the weighted image signals are subtracted from each other, which image signal components represent the image information stored at corresponding picture elements in the two X-ray images. In this manner, a bone image signal can be obtained, which can be expressed as $$S1 = SO_1 - \frac{\mu L^T}{\mu H^T} SO_2 + C \quad (1)$$

where C denotes a bias component. The bone image signal thus obtained represents a bone image, which is composed of the bone patterns.

Also, the first image signal SO1 and the second image signal SO2 are weighted in a different way, and the image signal components of the weighted image signals are subtracted from each other, which image signal components represent the image information stored at corresponding picture elements in the two X-ray images. In this manner, a soft tissue image signal S2 can be obtained, which is expressed as $$S2 = \frac{\mu L^B}{\mu H^B} SO_2 - SO_1 + C' \quad (2)$$

where C' denotes a bias component. The soft tissue image signal S2 represents a soft tissue image 43, which is composed of the soft tissue patterns. In this embodiment, of the two types of operations described above, only the operation with Formula (2) is carried out, and the soft tissue image signal S2 is obtained. The soft tissue image signal S2 serves as a difference signal.

Also, the image signal components of the first image signal SO1 and the second image signal SO2 are added to each other, which image signal components represent the image information stored at corresponding picture elements in the two X-ray images. In this manner, a superposition image signal SO is obtained, which can be expressed as $$SO=(SO1+SO2)/2 \quad (3)$$

The superposition image signal SO represents a superposition image 44 shown in FIG. 1A, which results from the superposition of the first X-ray image 41 and the second X-ray image 42 upon each other. The superposition image 44 can also be referred to as one kind of original image, which is composed of the soft tissue patterns and the bone patterns.

Figure 1B:
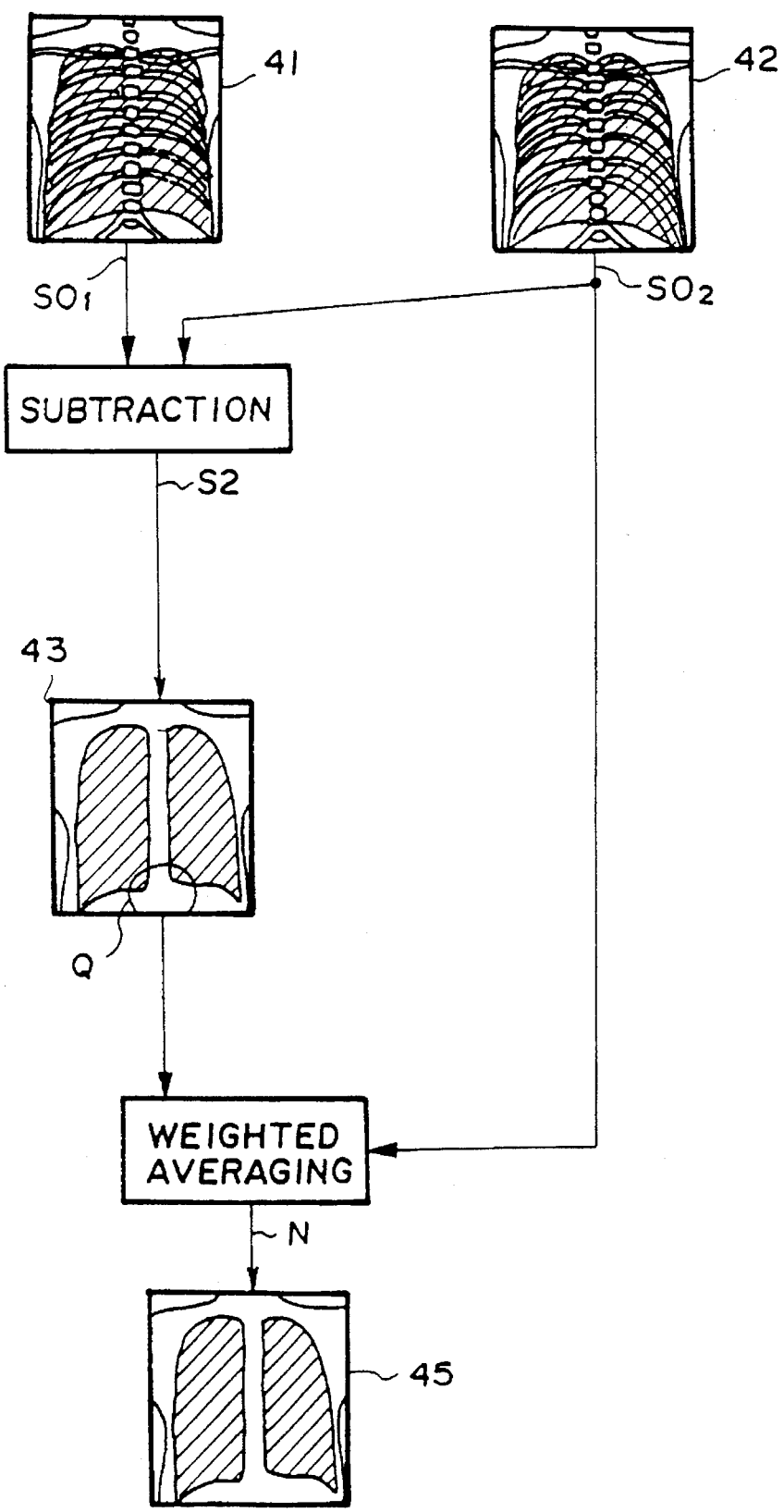
FIG. 1B is a flow chart showing the processes in a another embodiment of the method for processing an energy subtraction image in accordance with the present invention.

In the method for processing an energy subtraction image in accordance with the present invention, the first X-ray image 41 (i.e. the X-ray image recorded with the X-rays having a low energy level) or the second X-ray image 42 (i.e. the X-ray image recorded with the X-rays having a high energy level) may be utilized in lieu of the superposition image 44, as shown in FIG. 1B. However, the superposition image 44 should preferably be utilized. This is because the superposition image 44, which is obtained from the superposition of the first X-ray image 41 and the second X-ray image 42 upon each other, includes less noise components than the first X-ray image 41 and the second X-ray image 42, and therefore is advantageous for the subsequent processes. However, in cases where the superposition image 44 is utilized, the amount of calculations required becomes large. In cases where the amount of calculations is to be kept small, the X-ray image 41, which has been recorded with the X-rays having a low energy level, should preferably be utilized. (The X-ray image 41, which has been recorded with the X-rays having a low energy level, is advantageous from the point of view of graininess than the X-ray image 42, which has been recorded with the X-rays having a high energy level.)

Thereafter, a smoothing process is carried out on the superposition image signal SO, and a smoothed image signal SO' is thereby obtained. As the smoothing process, one of various processes may be employed. For example, a simple averaging process (i.e. an unsharp mask processing) may be employed wherein the mean value of the values of the image signal components of an image signal, which represent the picture elements belonging to a predetermined region having a predetermined picture element in the middle, is calculated and employed as the value of the image signal component representing the predetermined picture element. Alternatively, a median filter process may be employed wherein the median value of the values of the image signal components of an image signal, which represent the picture elements belonging to a predetermined region having a predetermined picture element in the middle, is calculated and employed as the value of the image signal component representing the predetermined picture element. As another alternative, an edge keeping filter (V-filter) process may be employed wherein a predetermined region having a predetermined picture element in the middle is divided into a plurality of small regions, and the variance of the values of the image signal components corresponding to each small region is calculated. A small region associated with the smallest variance is then found, and the mean value of the values of the image signal components corresponding to the small region associated with the smallest variance is employed as the value of the image signal component representing the predetermined picture element. As a further alternative, a process may be employed wherein Fourier transformation is carried out on an image signal, the signal obtained from the Fourier transformation is subjected to an operation for removing high spatial frequency components corresponding to noise components, and thereafter inverse Fourier transformation is carried out.

Also, the image signal components of the superposition image signal SO and the soft tissue image signal S2, which image signal components represent corresponding picture elements in the images, are weighted and averaged with the formula $$N=T(Lu) \cdot SO+\{1-T(Lu)\} \cdot S2 \quad (4)$$

where T(Lu) represents the weight factor given to the superposition image signal SO, which is one kind of original image signal before being subjected to the subtraction process, and 1−T(Lu) represents the weight factor given to the soft tissue image signal S2, which serves as the difference signal.

Figure 4:
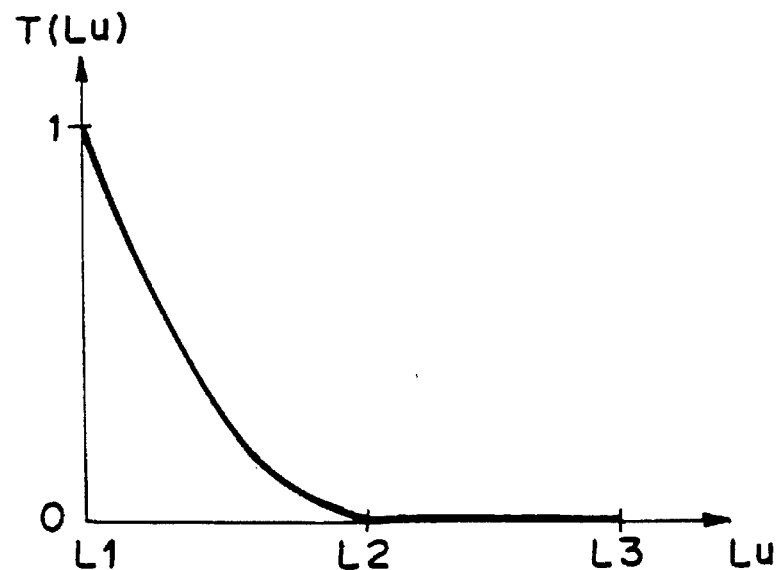
FIG. 4 is a graph showing an example of the relationship between a picture element value Lu, which is represented by a smoothed image signal, and a weight factor T(Lu).

The weight factor T(Lu) is determined in accordance with the picture element value (i.e. the digital value representing the image density at the picture element) Lu, which is represented by the smoothed image signal SO'. By way of example, the weight factor T(Lu) is determined in accordance with the characteristics shown in FIG. 4. Specifically, in cases where the picture element value Lu falls within the range of the maximum value L3 to a predetermined value L2, the weight factor T(Lu) is set at a value of zero. In cases where the picture element value Lu is smaller than the predetermined value L2, the weight factor T(Lu) is set at a larger value as the picture element value Lu becomes smaller, i.e. as the image density becomes lower. When the picture element value Lu is equal to the minimum value L1, the weight factor T(Lu) is set at the maximum value 1.

Specifically, information representing the aforesaid relationship between the picture element value Lu and the weight factor T(Lu) should preferably be stored as a table in a storage means. The value of the weight factor T(Lu) is then determined by referring to the table in accordance with the picture element value Lu, which is represented by the smoothed image signal SO'.

A composite image signal N is obtained from the weighted averaging process described above and is fed into the CRT display device 32 of the image processing and displaying apparatus 30, which is shown in FIG. 3. A visible radiation image is reproduced from the composite image signal N and is displayed as a composite image 45 on the CRT display device 32. In the composite image 45, the low image density portion, such as a vertebral body region Q, in the soft tissue image 43, at which noise is apt to occur due to the subtraction process, has been replaced by an image, which is intermediate between the superposition image 44 and the soft tissue image 43, or by the superposition image 44 itself. Specifically, in the composite image 45, the portion having a lower image density in the soft tissue image 43 becomes closer to the superposition image 44. Therefore, for the reasons described above, in the composite image 45, a large difference in image density does not occur between adjacent picture elements, and the occurrence of noise can be restricted.

Figure 5:
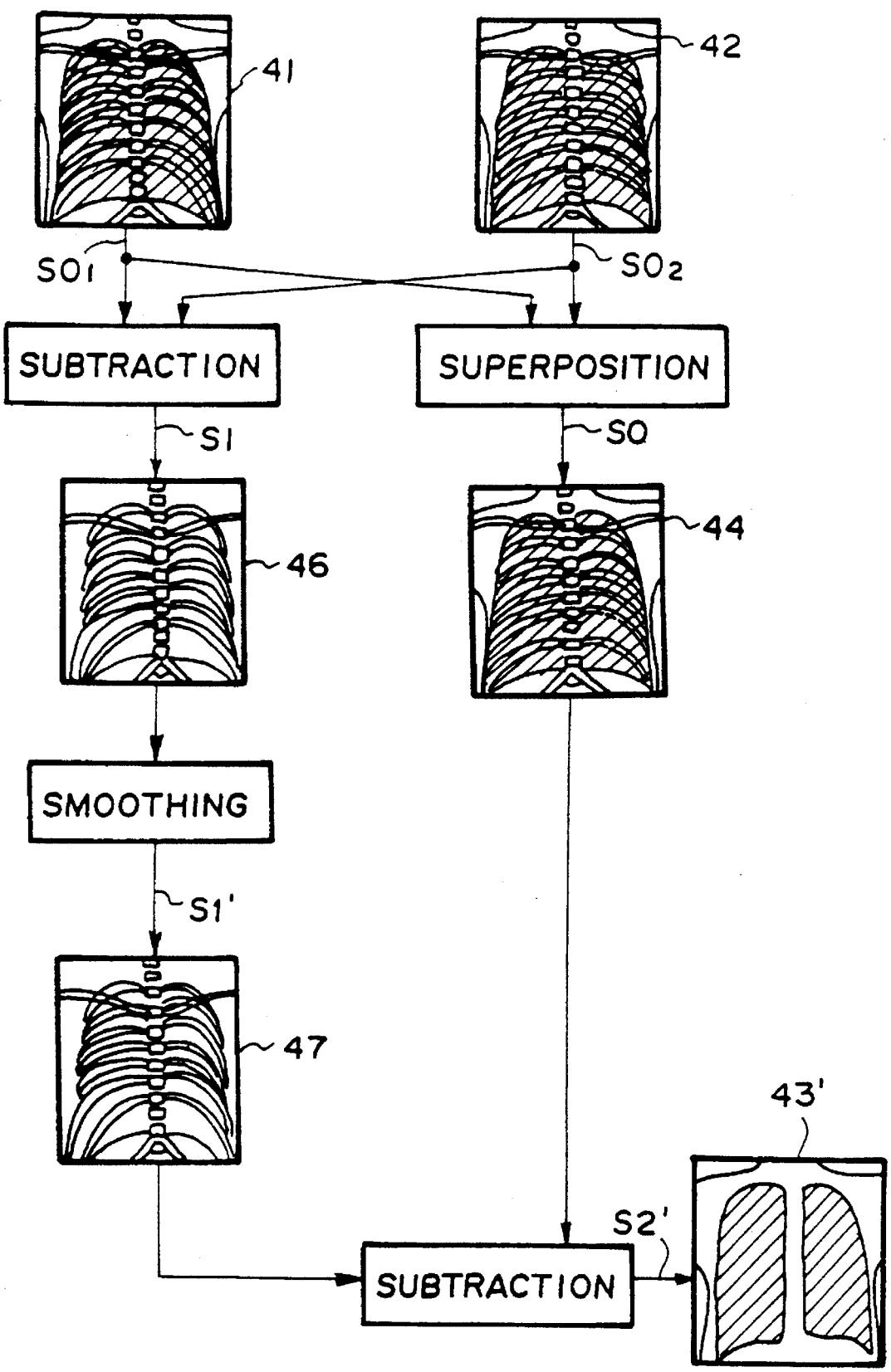
FIG. 5 is a flow chart showing the processes in another embodiment of the method for processing an energy subtraction image in accordance with the present invention.

A second embodiment of the method for processing an energy subtraction image in accordance with the present invention will be described hereinbelow with reference to FIG. 5. The second embodiment and the third embodiment, which will be described later, are different from the first embodiment in how the soft tissue image serving as the subtraction image is obtained. The other processes in the second and third embodiments may be carried out in substantially the same manners as those in the first embodiment. Therefore, only how the soft tissue image is obtained will be described hereinbelow. In FIG. 5, similar elements are numbered with the same reference numerals with respect to FIG. 1A.

As illustrated in FIG. 5, in the second embodiment, the subtraction process is carried out with Formula (1), and a bone image signal S1 representing a bone image 46, which is composed of the bone patterns. Also, in the same manner as that in the first embodiment, the superposition image signal SO representing the superposition image 44, which results from the superposition of the first X-ray image 41 and the second X-ray image 42 upon each other, is obtained.

Thereafter, the smoothing process is carried out on the bone image signal S1, and a smoothed bone image signal Si' representing a smoothed bone image 47 is thereby obtained. As in the smoothing process carried out on the superposition image signal SO described above, it is possible to employ one of various smoothing processes, such as the simple averaging process (i.e. the unsharp mask processing), the median filter process, the edge keeping filter (V-filter) process, and the process wherein Fourier transformation and inverse Fourier transformation are carried out. Also, it is possible to employ a smoothing process, in which a filter adaptive to a probability density function is utilized and which is disclosed in, for example, European Patent Publication No. 442 468A1. With the disclosed smoothing process, noise can be eliminated such that edges (i.e. step-like changes in density, which define boundaries among patterns of a plurality of different tissues of an object), which it is necessary to reproduce, may be kept sharp and no artifact may occur in the smoothed image. Also, noise can be eliminated quickly with simple operations.

Thereafter, the image signal components of the superposition image signal SO and the smoothed bone image signal Si', which image signal components represent the image information stored at corresponding picture elements in the two X-ray images, are weighted and subtracted from each other. In this manner, a processed soft tissue image signal S2' is obtained. The processed soft tissue image signal S2' represents a processed soft tissue image 43'. The processed soft tissue image signal S2' carries approximately the same image information as the soft tissue image signal S2 expressed as Formula (2) and includes less noise components than the soft tissue image signal S2 expressed as Formula (2).

In lieu of the soft tissue image signal S2 shown in FIG. 1A, the processed soft tissue image signal S2' representing the processed soft tissue image 43' is subjected to the weighted averaging process together with the superposition image signal SO. In this manner, as in the first embodiment, a composite image signal representing a soft tissue image, in which noise at a low image density portion has been reduced, can be obtained.

In this embodiment, the superposition image signal SO is obtained for use in the second subtraction process. Therefore, the superposition image signal SO can also be utilized directly for the weighted averaging process and for the process for determining the weight factor T(Lu).

Figure 6:
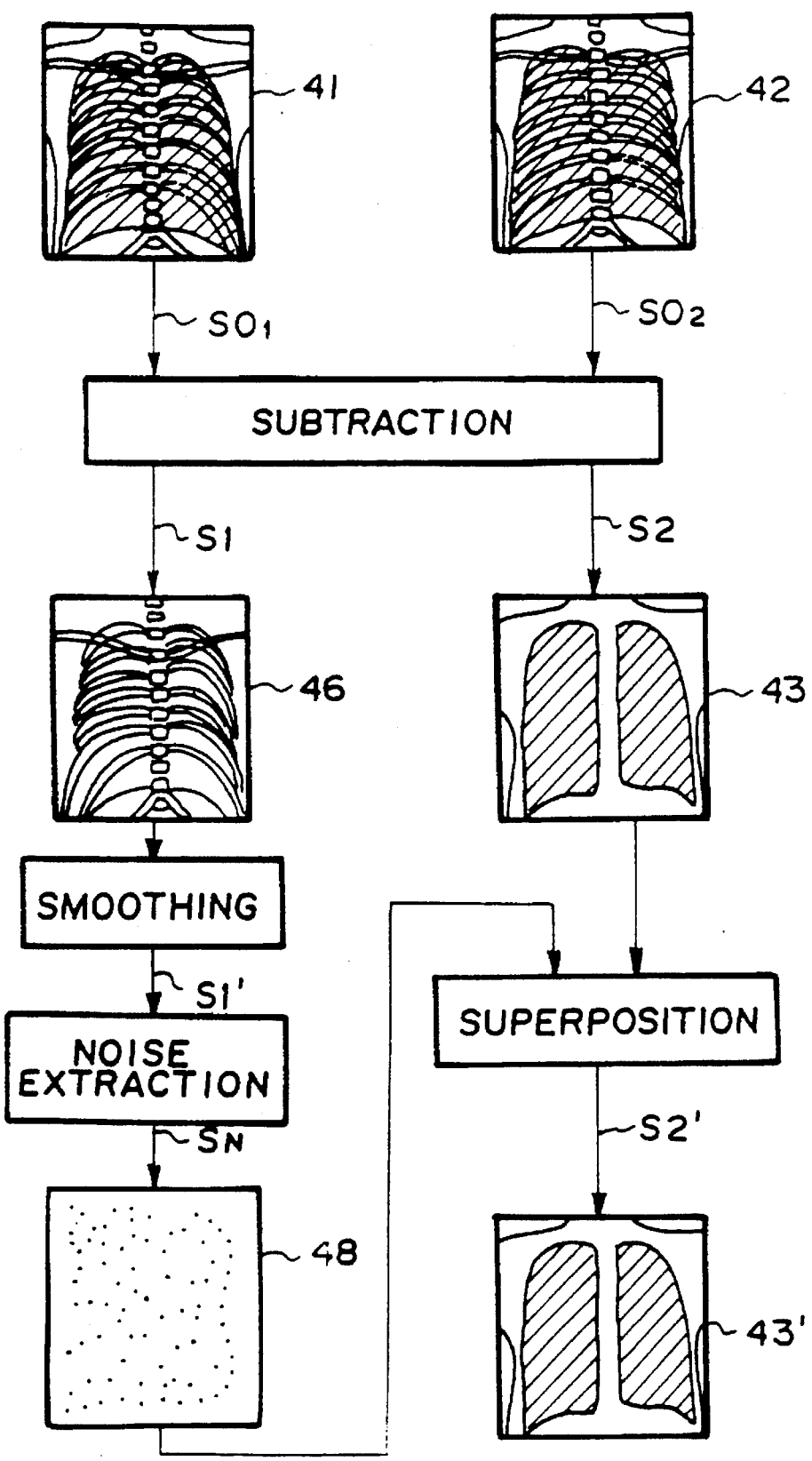
FIG. 6 is a flow chart showing the processes in yet another embodiment of the method for processing an energy subtraction image in accordance with the present invention.

A third embodiment of the method for processing an energy subtraction image in accordance with the present invention will be described hereinbelow with reference to FIG. 6. In the third embodiment, the bone image signal S1, which represents the bone image 46, and the soft tissue image signal S2, which represents the soft tissue image 43, are obtained with Formulas (1) and (2) from the first image signal SO1 representing the first X-ray image 41 and the second image signal SO2 representing the second X-ray image 42.

Thereafter, the smoothing process is carried out on the bone image signal S1 in the same manner as that in the second embodiment. In this manner, the smoothed bone image signal Si', in which the noise components included in the bone image 46 have been reduced, is obtained. The image signal components of the smoothed bone image signal Si' are then subtracted from the image signal components of the bone image signal S1, which image signal components represent the image information stored at corresponding picture elements in the two X-ray images. Thus a noise signal SN representing a noise image 48, which is composed of only the noise components, is obtained.

In the smoothed bone image signal Si', even if the information representing the edges in the bone image 46 has a level of spatial frequency as high as that of the noise components, the information representing the edges will not be lost. Therefore, by calculating the difference between the bone image signal S1 and the smoothed bone image signal Si', the noise signal SN can be obtained in which the information representing the edges has been completely canceled. Accordingly, the noise signal SN more accurately represents only the noise components of the bone image 46 than when a smoothing process was carried out such that the information representing the edges may be lost.

Thereafter, the noise signal SN and the soft tissue image signal S2 representing the soft tissue image 43 are weighted, and the image signal components of the weighted image signals are added to each other, which image signal components represent the image information stored at corresponding picture elements in the two images. In this manner, a processed soft tissue image signal S2' is obtained, which represents a processed soft tissue image 43'. The processed soft tissue image 43' has approximately the same image information as the soft tissue image 43 and includes less noise components than the soft tissue image 43.

In lieu of the soft tissue image signal S2 shown in FIG. 1A, the processed soft tissue image signal S2' representing the processed soft tissue image 43' is subjected to the weighted averaging process together with the superposition image signal SO. In this manner, as in the first embodiment, a composite image signal representing a soft tissue image, in which noise at a low image density portion has been reduced, can be obtained.

In the aforesaid second and third embodiments of the method for processing an energy subtraction image in accordance with the present invention, the subtraction image before being subjected to the weighted averaging process is subjected to a process for reducing noise as a whole. Various other noise reducing processes have heretofore been proposed in, for example, European Patent Publication No. 442 468A1 and other publications. In the present invention, any of such known noise reducing processes may be employed.

In the aforesaid embodiments of the method for processing an energy subtraction image in accordance with the present invention, a soft tissue image or a bone image is formed from X-ray images of the chest of a human body. However, the method for processing an energy subtraction image in accordance with the present invention is not limited to the formation of the soft tissue image or the bone image, but is applicable widely when either one or both of two images are to be obtained, in which the patterns of two different tissues of a single object have been emphasized or only such patterns are illustrated. For example, two such images may be an image, in which the patterns of mammary glands have been emphasized, and an image, in which the pattern of a malignant tumor has been emphasized.

Also, in the aforesaid embodiments of the method for processing an energy subtraction image in accordance with the present invention, stimulable phosphor sheets are used. However, the method for processing an energy subtraction image in accordance with the present invention is also applicable when other recording media, such as X-ray film (ordinarily combined with intensifying screens), are used.

What is claimed is:

1. A method for processing an energy substraction image in energy subtraction processing, comprising the steps of:

reading image data representing at least two radiation images of an object from at least two recording media, respectively, on which different images of at least a part of the object have been recorded, to obtain at least two analog original image signals, each of which is made up of a series of image signal components;

converting said at least two analog original image signals into original digital image signals, respectively;

subtracting image signal components of one of said original image signals from image signal components of the other one of said original digital image signals to obtain a difference signal representing an image of a specific structure of the object;

carrying out a smoothing process on one of said original digital image signals to obtain a smoothed image signal;

weighting and averaging image signal components of said difference signal and said image signal components of said one of said original digital image signals such that the weight given to said one of said original digital image signals is made larger as an image density represented by said smoothed image signal with respect to a picture element becomes lower; and reproducing a visible radiation image of the object utilizing a composite image signal obtained from said weighting and averaging step.

2. A method as defined in claim 1 wherein said difference signal before being subjected to the weighted averaging process is subjected to a process for reducing noise as a whole.

3. A method as defined in claim 1 wherein said recording media are stimulable phosphor sheets.

4. A method as defined in claim 3, wherein each of said at least two analog original image signals is obtained by exposing stimulable phosphor sheets, respectively carrying said at least two analog original image signals, to stimulating rays, which cause said stimulable phosphor sheets to emit light in proportion to the amount of energy stored thereon during exposure to radiation, and photoelectrically detecting the emitted light.

5. A method as defined in claim 4 wherein said stimulating rays are a laser beam, 6. A method as defined in claim 1 wherein said recording media are photographic film, 7. A method as defined in claim 1, wherein said subtracting step is performed in accordance with the following equation to obtain said difference signal S1, $$S1 = SO_1 - \frac{\mu Lt}{\mu Ht} SO_2 + C;$$

where $SO_1$ and $SO_2$ respectively correspond to first and second ones of said original digital image signals; $\mu Lt$ and $\mu Ht$ respectively represent an absorption coefficient of soft tissues with respect to low energy components of radiation images and high energy components of radiation images; and C and C' each denote a bias component.

8. A method for processing an energy substraction image in energy subtraction processing, comprising the steps of:

reading image data of at least two radiation images representing an object from at least two recording media, respectively, on which different images of at least a part of the object have been recorded, to obtain at least two analog original image signals, each of which is made up of a series of image signal components;

converting said at least two analog original image signals into original digital image signals, respectively;

subtracting image signal components of one of said original image signals from image signal components of the other one of said original digital image signals to obtain a difference signal representing an image of a specific structure of the object;

adding said image signal components of said original digital image signals to generate a superposition signal;

carrying out a smoothing process on said superposition signal to obtain a smoothed image signal;

weighting and averaging image signal components of said difference signal and said image signal components of said smoothed image signal such that the weight given to said difference signal is made larger as an image density, represented by said smoothed image signal with respect to a picture element, becomes lower; and reproducing a visible radiation image of the object utilizing a composite image signal obtained from said weighting and averaging step.

9. A method for processing an energy substraction image in energy subtraction processing, comprising the steps of:

reading image data of at least two radiation images representing an object from at least two recording media, respectively, on which different images of at least a part of the object have been recorded, to obtain at least two analog original image signals, each of which is made up of a series of image signal components;

converting said at least two analog original image signals into original digital image signals, respectively;

subtracting image signal components of one of said original image signals from image signal components of the other one of said original digital image signals to obtain a difference signal representing an image of a specific structure of the object;

adding said image signal components of said original digital image signals to generate a superposition signal;

carrying out a smoothing process on said difference signal to obtain a smoothed image signal;

weighting and averaging image signal components of said smoothed image signal and image signal components of said superposition signal;

subtracting weighted image signal components of said smoothed image signal and weighted image signal components of said superposition signal from each other to obtain a composite image signal; and reproducing a visible radiation image of the object utilizing said composite image signal.

10. A method as defined in claim 9, wherein said subtracting step to obtain a difference signal is performed in accordance with the following equation to obtain said difference signal S1, $$S1 = SO_1 - \frac{\mu Lt}{\mu Ht} SO_2 + C;$$

where $SO_1$ and $SO_2$ respectively correspond to first and second ones of said original digital image signals; $\mu Lt$ and $\mu Ht$ respectively represent an absorption coefficient of soft tissues with respect to low energy components of radiation images and high energy components of radiation images; and C and C' each denote a bias component.

11. A method for processing an energy substraction image in energy subtraction processing, comprising the steps of:

reading image data of at least two radiation images representing an object from at least two recording media, respectively, on which different images of at least a part of the object have been recorded, to obtain at least two analog original image signals, each of which is made up of a series of image signal components;

converting said at least two analog original image signals into original digital image signals, respectively;

weighting and subtracting image signal components of one of said original image signals from image signal components of the other one of said original digital image signals in accordance with the following equations to obtain a first difference signal S1 and a second difference signal S2, $$S1 = SO_1 - \frac{\mu Lt}{\mu Ht} SO_2 + C;$$

$$S2 = \frac{\mu Lb}{\mu Hb} SO_2 - SO_1 + C'$$

where $SO_1$ and $SO_2$ respectively correspond to first and second ones of said original digital image signals; $\mu Lt$ and $\mu Ht$ respectively represent absorption coefficients of soft tissues with respect to low energy components of radiation images and high energy components of radiation images; $\mu Lb$ and $\mu Hb$ respectively represent absorption coefficients of bones with respect to low energy components of radiation images and high energy components of radiation images; and C and C' each denote a bias component;

carrying out a smoothing process on said first difference signal to obtain a smoothed image signal;

subtracting image signal components of said smoothed image signal from image signal components of said first difference signal to obtain a noise signal;

weighting said image signal components of said second one difference signal and image signal components of said noise signal;

adding weighted image signal components of said second difference signal and weighted image signal components of said noise signal to each other to generate a superposition signal; and reproducing a visible radiation image of the object utilizing said superposition signal.

* * * * *